United States Patent
Beal

(10) Patent No.: US 7,082,445 B2
(45) Date of Patent: Jul. 25, 2006

(54) FAST DATA COPY USING A DATA COPY TRACK TABLE

(75) Inventor: David G. Beal, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 426 days.

(21) Appl. No.: 10/114,677

(22) Filed: Apr. 1, 2002

(65) Prior Publication Data

US 2003/0187887 A1 Oct. 2, 2003

(51) Int. Cl.
*G06F 17/00* (2006.01)
(52) U.S. Cl. ...................................... 707/204
(58) Field of Classification Search ............... 707/101, 707/204
See application file for complete search history.

(56) References Cited

U.S. PATENT DOCUMENTS

| | | | | |
|---|---|---|---|---|
| 5,403,639 A | * | 4/1995 | Belsan et al. | 707/204 |
| 5,832,263 A | * | 11/1998 | Hansen et al. | 719/322 |
| 5,901,327 A | * | 5/1999 | Ofek | 710/5 |
| 6,021,509 A | | 2/2000 | Gerdt et al. | 714/7 |
| 6,128,630 A | | 10/2000 | Shackelford | 707/204 |
| 6,189,015 B1 | * | 2/2001 | Reed et al. | 707/201 |
| 6,212,531 B1 | | 4/2001 | Blea et al. | 707/204 |

OTHER PUBLICATIONS

Wilkes et al, 'The HP AutoRAID hierarchical storage system', 1995, ACM Press, pp. 96-108.*
"Implementing ESS Copy Services on S/390", ibm.com/redbooks; Mark Blunden, Sverre Bergum, Jose Dovidauskas, Clemente Vaia, First Edition, Dec. 2000.
"Implementing Snapsnot", www.redbooks.ibm.com, Alison Pate, Dean Allen, Roar Framhus, Richard Moore, Hannes Tekloth, International Technical Support Organization, Second Edition, Jul. 1999.

* cited by examiner

*Primary Examiner*—Uyen Le
*Assistant Examiner*—Cheryl M Shechtman
(74) *Attorney, Agent, or Firm*—Dale F. Regelman

(57) ABSTRACT

A data structure, method, and computer system for fast data copy is provided which uses control structures in a data copy track table. The control structures include a physical location pointer, a physical location pointer flag, a forward track pointer and a backward source pointer. These control structures are used in an update-in-place architecture. Requests for source or target data updates do not require additional write cycles.

14 Claims, 5 Drawing Sheets

US 7,082,445 B2

FAST DATA COPY USING A DATA COPY TRACK TABLE

BACKGROUND OF THE INVENTION

1. Field of the Invention

This invention relates in general to improvements in the field of computer systems having the capability of copying data from one storage element to another, and more particularly, to a method for implementing a rapid, efficient, high performance method of copying data.

2. Description of the Background Art

A data copy function in a computer system is typically used to save a recent version of data on a data storage device such as a disk drive, tape drive, or other storage device. The data copy function along with the storage devices form a backup/restore subsystem. One frequent use of this subsystem is to protect against loss of data. Data currently being processed can be destroyed, corrupted, inadvertently changed, or otherwise damaged as a result of problems such as power failure, hardware failure, or operator error. The backup/restore subsystem can greatly alleviate the effects of damaged data by reproducing a previous version of the data before the damage occurred. Other uses of data copying include improving efficiency of creating data bases, creating a common format of data files, and numerous other uses known to those familiar with file management programming.

Successful recovery or use of data requires that all of the data is copied at a consistent point in time. A consistent point in time means that any update of the data is inhibited during the copy process. One method of providing a copy of the data is to use a technique called snapshot. Snapshot is used, for example, in the IBM RAMAC Virtual Array product. Snapshot uses a log structure array (LSA) containing sets of pointers indicating the location of the data on the physical storage device. This snapshot technique does not require a physical copy of the data from one physical location to another. Snapshot instead uses pointers in an LSA to point to the same disk storage location for both the original and copied data. Pointer manipulation is usually much faster than physically copying the data. Future requests to write an updated version of either the original data or the copied data result in the updated data being written to a new physical storage device location.

One advantage of using a snapshot technique in a log structured array environment is the ability to replicate a copy of data across the entire subsystem through the replication of entries in the LSA. One track of a host volume could, using snapshot, be replicated across the entire set of volumes or devices addressable within a system such as the IBM RAMAC Virtual Array subsystem. This has considerable time saving advantages.

The snapshot technique has some significant disadvantages which are associated with the use of an LSA. For example, snapshot imposes an overhead on managing data because, as implemented with LSA in the IBM RAMAC Virtual Array, data compression, free space collection, and virtual space allocation are imposed. As a consequence of using a LSA, newly written data is always placed in new back end storage locations. As used herein, the term "back end storage" refers to the physical storage devices. Free space collection is a background activity that continuously occurs when using an LSA and consumes valuable CPU cycles within the storage subsystem. Virtual allocation of data always writes updates to a new back end location that has been made available through the free space collection process. Since there is a not a guaranteed storage location associated with every issued write request, the available disk storage may eventually be exhausted. This adds complication to the design and requires unique reporting mechanisms for alerting the user when disk storage is no longer available. To help overcome the possibility of running out of disk storage, data compression is used. Data compression helps to reduce the number of occasions when disk storage is not available, but does not completely solve the problem and adds significant design complications.

Snapshot therefore has some performance advantages; however, using an LSA also has some significant disadvantages.

Another method of copying data is called flashcopy. Flashcopy as implemented in the IBM Enterprise Storage Server uses an 'update-in-place' architecture and does not use an LSA. An update-in-place architecture places updated data in the same physical location as the original data. Flashcopy allows the copied data to be accessed by pointing to the locations of the original and copied data. Usually, a physical copy of the data is written to the target volume. Any new requested written update to the source data requires the undesirable overhead that the data is physically copied prior to the update taking place. In an attempt to minimize this write overhead penalty, the physical data copy operations are usually performed as a background task. The background activity of physically copying the data may be temporarily deferred depending on the priority of completing other tasks to help alleviate the impact on system performance.

What is needed is a fast, efficient method of copying data which has the speed of using pointers for copying, but does not degrade system performance with overhead tasks of data compression, free space collection, virtual space allocation, or interruptions from additional write requests.

SUMMARY OF THE INVENTION

In a preferred embodiment, the invention provides a data copy track table (DCTT) residing in computer memory having a set of pointers and flags which are used to provide a very efficient method of rapidly copying data. The invention provides a method using an update-in-place architecture and does not require data compression, free space collection, and virtual allocation of disk space. When using the preferred embodiment, the performance of the computer system is insensitive to the density of write requests. The DCTT comprises entries including a physical track pointer, a physical track pointer reserved flag, a forward track pointer, and a backward source pointer. Using this set of pointers and flags which constitute the control structures, updated source data may be written to the target volume and may then be redefined as the target data using pointer manipulation. Thus a reduction of system performance may be avoided by circumventing additional writing operations.

The embodiments of the invention may take the form of a data structure, method, or a computer system.

DETAILED DESCRIPTION OF THE INVENTION

In the preferred embodiments of the invention a data structure, method, and computer system are provided wherein pointers in an update-in-place architecture are used to perform a copy function. One of the advantages of this invention is that system performance is excellent for computing environments which have both low and high density write requests. In the preferred embodiment of the invention, a data copy track table (DCTT) is maintained. The DCTT has entries including a physical track pointer, a physical track pointer reserved flag, a forward track pointer, and a backward source pointer. The advantages of the present invention will become apparent from the following detailed description, which when taken in conjunction with the accompanying drawings, illustrate by way of example the principles of the invention.

Figure 1:
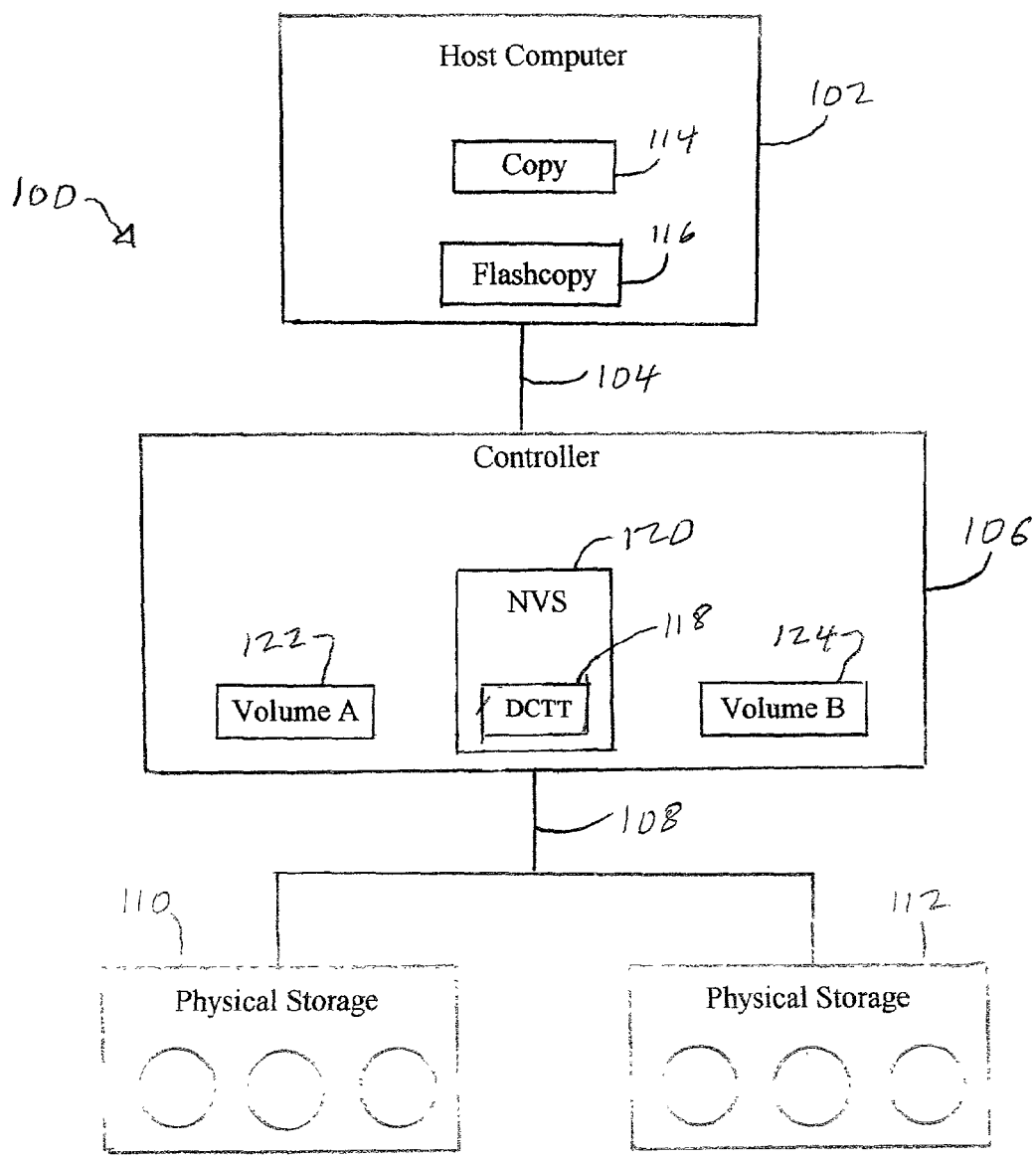
FIG. 1 shows an illustration of a computer system using the present invention.

An exemplary apparatus 100 used to implement the preferred embodiment of the invention is illustrated in FIG. 1. A host computer 102 is coupled via a bus 104 to a storage controller 106. The storage controller 106 is coupled via another bus or set of input/output channels 108 to one or more physical storage devices 110, 112. In a preferred embodiment, a plurality of data storage devices 110, 112 are arranged in one or more RAID (redundant arrays of inexpensive disk) subsystems. Any physical storage devices such as disk drives, tape drives, optical drives, or other devices may be used for the physical devices 110, 112 in FIG. 1.

The host computer 102 executes one or more computer programs 114, 116 or logic that control the operation of the host computer 102 and the interaction between the host computer and the controller 106. In one embodiment, the computer programs comprise a program 114 which can issue a copy request and a program 116 which can control a fast copy function.

Again referring to FIG. 1, the storage controller 106 includes one or more computer programs 118 or logic that control the operation of the storage controller 106, the interaction of the storage controller with the host computer 102, and the interaction of the storage controller 106 with the physical storage devices 110, 112. In one embodiment, the program includes a data copy track table (DCTT) 118 which preferably resides in nonvolatile memory (NVS) 120. In an alternate embodiment the DCTT data structure may be encoded on a computer-useable medium such as a disk, tape, or network connection. The DCTT 118 provides the access logic for the physical storage devices 110, 112.

Referring to FIG. 1, the controller 106 constructs virtual volumes 122, 124 in the memory of the storage controller 106 for access by the host computer 102. The virtual volumes 122, 124 normally emulate physical storage locations (cylinder, head, track, etc.) which are translated by the DCTT 118 to locations in the physical storage devices 110, 112. In this emulation, the host computer 102 (or any computer program executed thereby) "views" the volumes 122, 124 via the DCTT 118 as sequentially numbered tracks in virtual storage devices. The tracks are the locations in the volumes of the source and copied data. This emulation is accomplished by the DCTT 118 by maintaining entries for each volume. Each entry in the DCTT 118 includes pointers representing one or more sequentially numbered virtual tracks. The pointers reference data stored in the physical storage devices 110, 112. Upon receiving a request to copy data, the pointers in the DCTT identifies where to put the data in the target volume. Until a request for an update is made, the pointers for both the original and copied data may point to the same physical storage location.

In an alternative embodiment, the volumes 122, 124 recognized by the host computer 102 correspond to the actual physical storage devices.

The exemplary embodiment shown in FIG. 1 is not intended to limit the present invention. Those skilled in the art will recognize that other alternative hardware environments may be used without departing from the scope of the present invention. Additionally, the present invention may be implemented as a method, apparatus, or article of manufacture using standard programming and engineering techniques to produce software, firmware, hardware, or any combination thereof. The term "article of manufacture" (or alternatively, "computer-useable memory device") as used herein is intended to encompass any device, carrier, or media that provides access to instructions or data useful in performing the same or similar functionality. Those skilled in the art will recognize many modifications may be made to this configuration without departing from the scope of the present invention.

Figure 2:
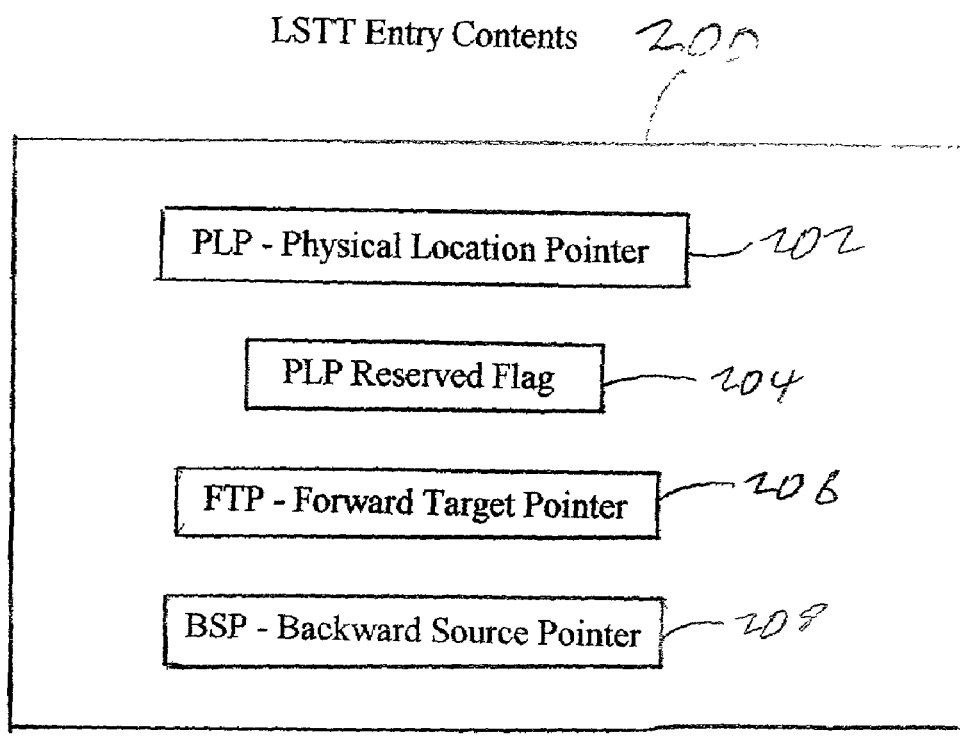
FIG. 2 illustrates the pointers and flag which comprise the contents of an entry in the DCTT.

In the present invention each set of data has entries in the DCTT including entities as illustrated in FIG. 2. The entries in the DCTT for a given set of data are referred to as the control structure for that set of data. The PLP 202, physical location pointer, contains a data structure that points to the physical location of the data. An associated flag, PLP reserved flag 204, is maintained to indicate if the PLP 202 is available for use by new host write operations. The FTP 206, forward target pointer, is a data structure that points to the control structure of the copied track. The FTP 206 will be NULL (empty) for a given volume if that volume is not an active participant in a copy chain. A copy chain is the established linkage of pointers during a copy function as described in detail below. The BSP 208, backward source pointer, contains the linkage to the control structure of the source volume. The present invention provides for the use of the DCTT entries within an update-in-place architecture.

Figure 3:
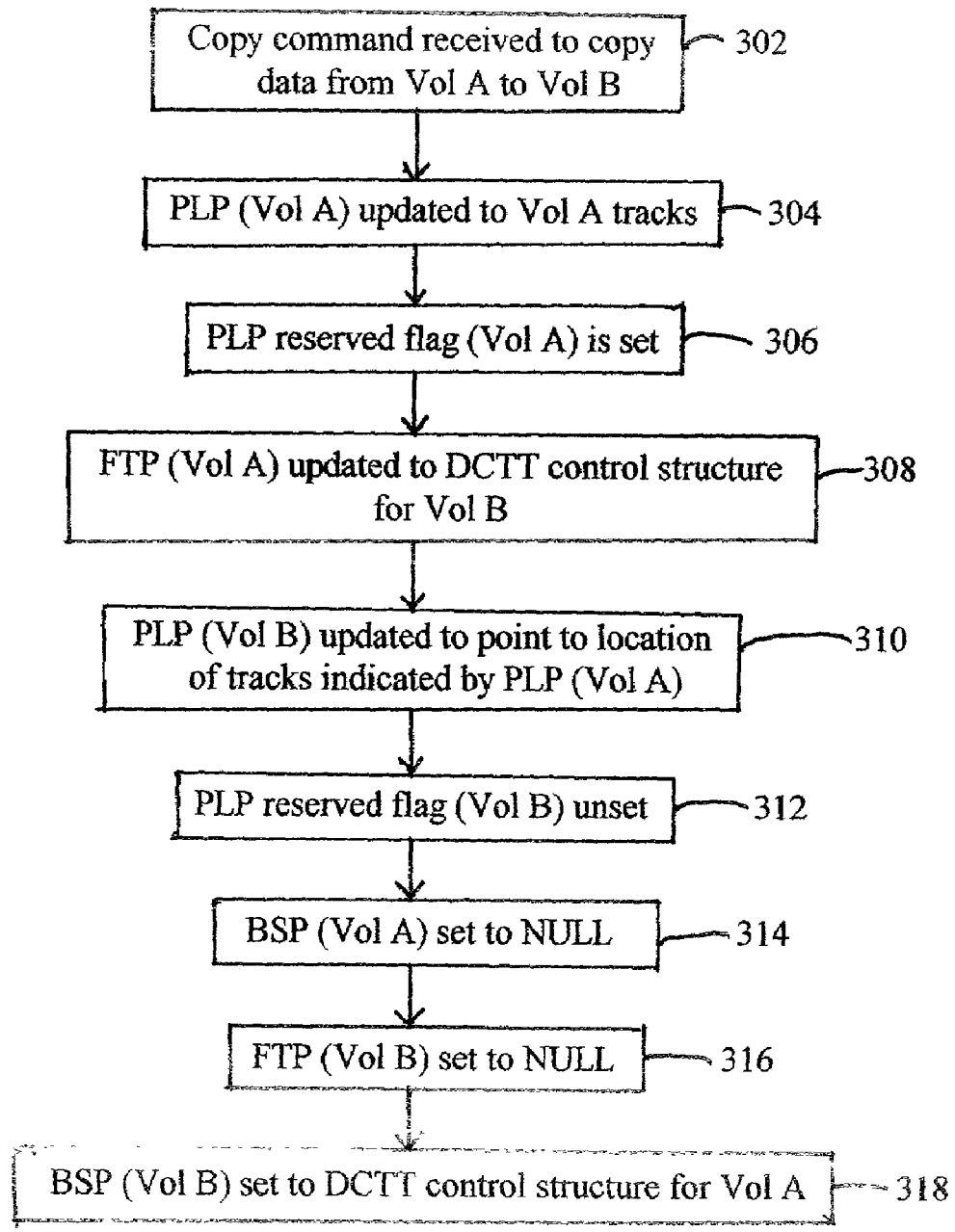
FIG. 3 illustrates the disposition of the pointers and flags of the source and target volumes when a request to copy data is received.

FIG. 3 illustrates an example of the disposition and alteration of the DCTT entries upon receiving a request for a copy. For this example it is assumed that it is desired to copy data from volume A to volume B. As used herein volume A is referred to as the source volume {the location of the data to be copied} and volume B is the target volume (the location of where the copied data will be stored). A request for copy 302 is received to copy data from volume A to volume B. The PLP for each track in volume A is updated 304 to the location of volume A tracks containing the desired data. The PLP reserved flag for volume A is set 306. The FTP for volume A is updated to point to the DCTT control structure for the tracks in volume B 308. The PLP of volume B is updated to point to the location of the tracks indicated by the PLP of volume A 310. The PLP reserved flag for volume B is unset. As used herein "unset" is used to describe the flag as not being set regardless of the previous state. The BSP for volume A is set to NULL 314, and the FTP for volume B is set to NULL 316. Finally the BSP for volume B is set to point to the DCTT control structure for volume A 318.

When the copy request has been received, the entries of the DCTT data structure are altered as described above and as illustrated in FIG. 3. Generally the manipulation of the entries in the DCTT is much faster than physically copying the data from volume A to volume B. The implementation of the DCTT does not require performance reducing tasks such as data compression and free space allocation since with update-in-place architecture all the storage volumes are guaranteed to have back end storage space.

According to an embodiment of the present invention, if a write operation is requested to update the source data, then the updated source data is written to the target volume. Using the pointers, the newly written data is redefined as the source data and the unaltered original data is continued to be defined as the copied data. This ability to write updated source data without the necessity of first physically copying the data demonstrates a significant advantage of the present invention.

Figure 4:
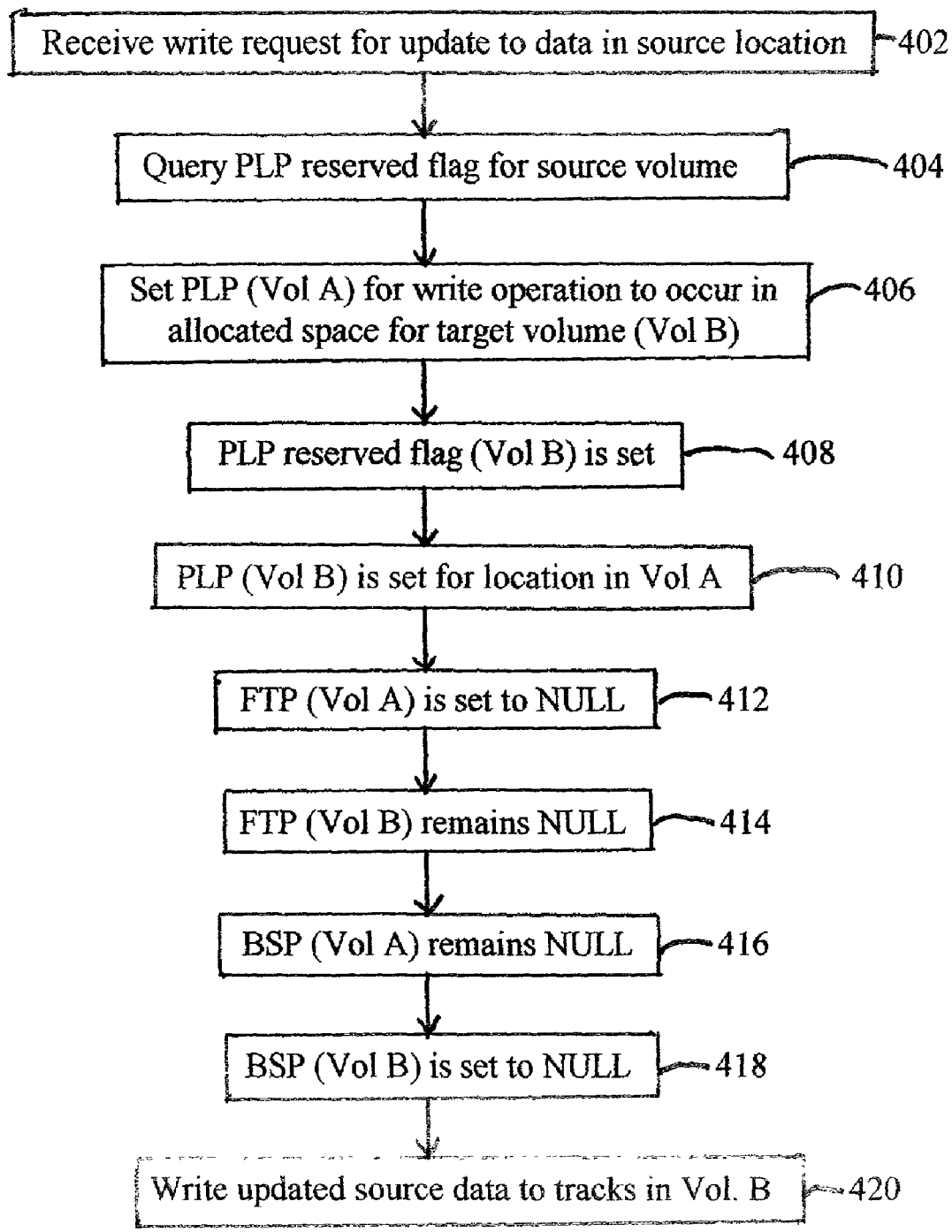
FIG. 4 illustrates the disposition of the pointers and flags of the source and target volumes when a request to write altered data is received before a pending copy request is complete; and, FIG. 5 illustrates the disposition of the pointers and flags of the source and target volumes when a request to copy the source data to a third volume has been received before a pending copy request is complete.

FIG. 4 illustrates an embodiment of the method 400 of using the DCTT entries when a write request is received 402 and a previous copy chain is active. In this embodiment it is assumed that the write request is to update data in the source volume. The PLP reserved flag for the source volume (volume A) is queried 404. The PLP for volume A is set for the write operation to occur in the allocated space in volume B 406 (the target volume). The FLP reserved flag of volume B is set 408. The PLP pointer for volume B is set to the location of the original data in volume A 410. The FTP for volume A is set to NULL 412. The FTP for volume B remains NULL 414. The BSP for volume A remains NULL 416. And finally, the BSP for volume B is set to NULL 418. The updated source data is then written to the tracks in volume B 420. The copy chain updates have flow been completed and the copy chain no longer exists.

One of the advantages of the method illustrated in FIG. 4 is that a background copy is not required. Instead the PLP in the DCTT entries are swapped between the source and the target volumes. This results in a substantial improvement in system performance.

Figure 5:
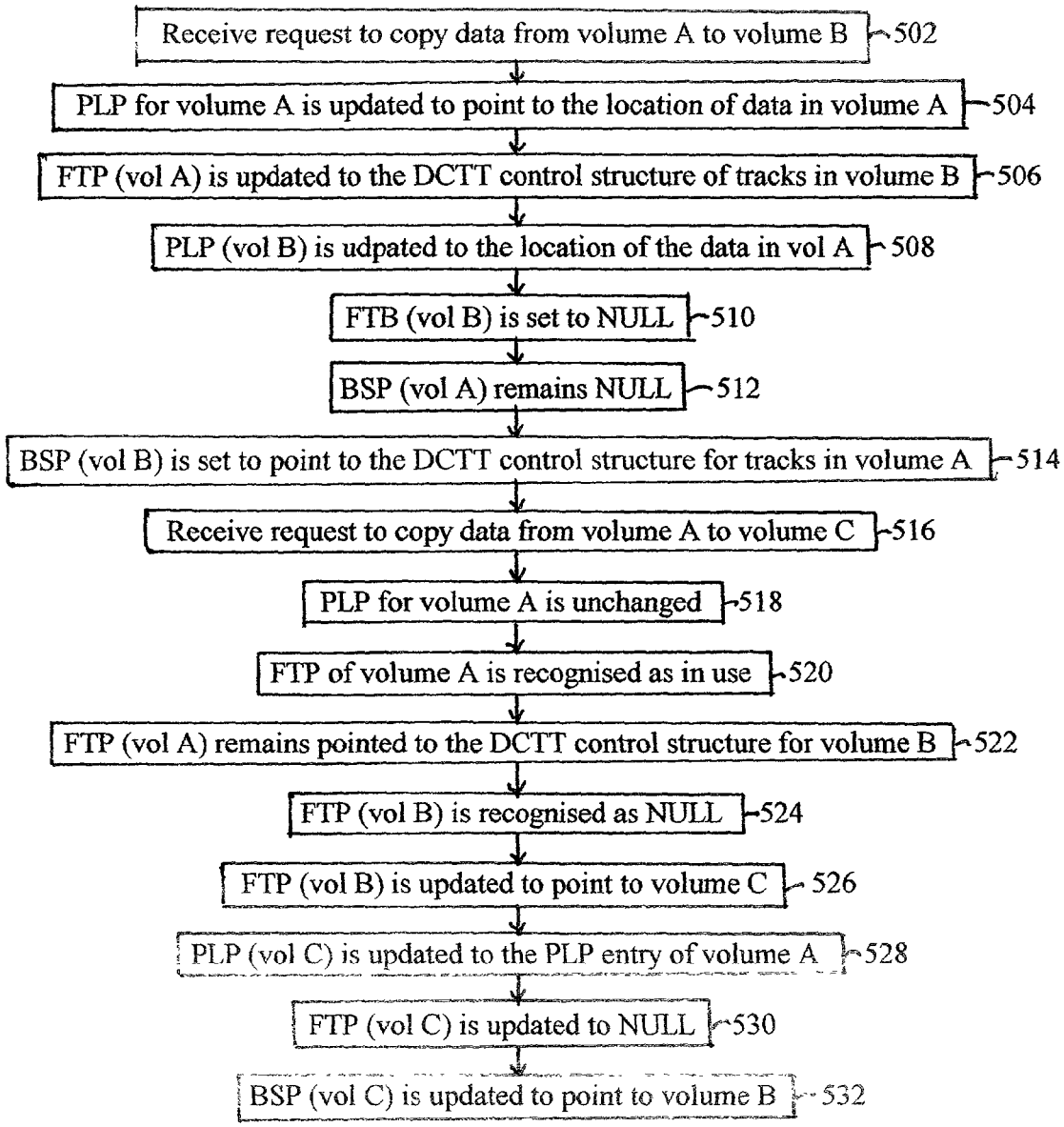

The embodiment of the DCTT illustrated in FIG. 2 can easily be used for more complicated environments where more than one copy request is active. Referring to FIG. 5, a request to copy data from volume A to volume B is received 502. The PLP for volume A is updated 504 to point to the location of the tracks in volume A containing the data. The FTP of volume A is updated 506 to point to the DCTT control structure for the tracks in volume B. The PLP of volume B is updated 508 to point to the tracks in volume A. The FTP for volume B is set to NULL 510. The BSP for volume A remains NULL 512 and the BSP for volume B is set 514 to point at the DCTT control structure for volume A. If a request is now received 516 to copy the data from volume A to volume C then the PLP for volume A will remain unchanged 518. The FTP for volume A will be recognized to be in use 520, therefore the FTP of volume A will remain pointed to the DCTT contol structure for volume B 522. The FTP of volume B is recognized to be NULL 524 and is then updated to point to the DCTT control structure for volume C 526. The PLP of volume C is updated 528 to the PLP for volume A. The FTP of volume C is updated to NULL 530. The BSP of volume C is updated 532 to point to the DCTT control structure for volume B. The data copy from volume A to volume B and from volume A to volume C has now been accomplished. Write updates to Volumes A, B, or C now use the copy chain as described above to locate the physical tracks in the storage devices.

In alternate embodiments of the present invention, other types and configurations of computer could be used. For example, the invention need not be restricted to the hardware and software configuration illustrated herein. Other mainframes, minicomputers, person computer, or networks of computers could be used with the present invention.

In alternate embodiments of the present invention, other logic than that described herein could be performed without departing from the scope of the present invention. For example, the invention need not be restricted to the exact steps or elements of the invention illustrated herein.

From the forgoing it will be appreciated that the invention provides a novel and advantageous data structure, method, and computer system for fast data copy. The embodiments of the invention described herein have a significantly improved system performance.

What is claimed is:

1. A computer-implemented method to copy data from a source volume to a target volume, comprising the steps of:
   providing a storage controller comprising memory, a source volume, a target volume, and a data copy track table written to said memory, wherein said data copy track table comprises, for each of said source volume and said target volume, a control structure comprising a first pointer comprising a physical location pointer, a second pointer comprising a physical location pointer reserved flag, a third pointer comprising a forward target pointer, and a fourth pointer comprising a backward source pointer;
   receiving by said storage controller a request to copy data from said source volume to said target volume;
   if the physical location pointer reserved flag for said source volume is not set, setting said physical location pointer for said source volume to indicate the location of the data in the source volume;
   setting the physical location pointer reserved flag for said source volume;
   setting the forward target pointer of said source volume to said the data copy track table control structure for said target volume;
   unsetting the physical location pointer reserved flag of said target volume;
   setting the forward target pointer of the target volume to a null value;
   setting the backward source pointer of the source volume to a null value; and,
   setting the backward source pointer of the target volume to the data copy track table control structure for said source volume.

2. The computer-implemented method of claim 1 wherein said memory comprises nonvolatile memory.

3. The computer-implemented method of claim 1, wherein the source and target volumes comprise virtual volumes.

4. The computer-implemented method of claim 1, wherein said source and target volume comprise physical volumes.

5. The computer-implemented method of claim 1, further comprising the steps of:
   receiving by said storage controller a request to update the data in said source volume;
   updating the physical location pointer for said source volume to indicate the location of the copied tracks in said target volume;
   setting the physical location pointer reserved flag for said target volume;

setting the physical location pointer for said target volume to indicate the track location in the source volume;

setting the forward target pointer of said source volume to a null value;

maintaining the forward target pointer of the target volume to a null value;

maintaining the backward source pointer of the source volume to a null value;

setting the backward source pointer of the target volume to a null value; and, writing the data update to the target volume.

6. An article of manufacture comprising memory, a source volume, a target volume, and a data copy track table written to said memory, wherein said data copy track table comprises, for each of said source volume and said target volume, a control structure comprising a first pointer comprising a physical location pointer, a second pointer comprising a physical location pointer reserved flag, a third pointer comprising a forward target pointer, a fourth pointer comprising a backward source pointer, and a computer useable medium having computer readable program code disposed therein to copy data from a source volume to a target volume, the computer readable program code comprising a series of computer readable program steps to effect:

receiving a request to copy data from said source volume to said target volume;

if the physical location pointer reserved flag for said source volume is not set, setting said physical location pointer for said source volume to indicate the location of the data in the source volume;

setting the physical location pointer reserved flag for said source volume;

setting the forward target pointer of said source volume to said the data copy track table control structure for said target volume;

unsetting the physical location pointer reserved flag of said target volume;

setting the forward target pointer of the target volume to a null value;

setting the backward source pointer of the source volume to a null value; and, setting the backward source pointer of the target volume to the data copy track table control structure for said source volume.

7. The article of manufacture of claim 6 wherein said memory comprises nonvolatile memory.

8. The article of manufacture of claim 6, wherein the source and target volumes comprise virtual volumes.

9. The article of manufacture of claim 6, wherein said source and target volume comprise physical volumes.

10. A computer program product usable with a programmable computer processor having computer readable program code embodied therein to copy data using a storage controller comprising memory, a source volume, a target volume, and a data copy track table written to said memory, wherein said data copy track table comprises, for each of said source volume and said target volume, a control structure comprising a first pointer comprising a physical location pointer, a second pointer comprising a physical location pointer reserved flag, a third pointer comprising a forward target pointer, and a fourth pointer comprising a backward source pointer, comprising:

computer readable program code which causes said programmable computer processor to receive a request to copy data from said source volume to said target volume;

computer readable program code which, if the physical location pointer reserved flag for said source volume is not set, causes said programmable computer processor to set said physical location pointer for said source volume to indicate the location of the data in the source volume;

computer readable program code which causes said programmable computer processor to set the physical location pointer reserved flag for said source volume;

computer readable program code which causes said programmable computer processor to set the forward target pointer of said source volume to said the data copy track table control structure for said target volume;

computer readable program code which causes said programmable computer processor to unset the physical location pointer reserved flag of said target volume;

computer readable program code which causes said programmable computer processor to set the forward target pointer of the target volume to a null value;

computer readable program code which causes said programmable computer processor to set the backward source pointer of the source volume to a null value; and, computer readable program code which causes said programmable computer processor to set the backward source pointer of the target volume to the data copy track table control structure for said source volume.

11. The computer program product of claim 10, wherein said memory comprises nonvolatile memory.

12. The computer program product of claim 10, wherein the source and target volumes comprise virtual volumes.

13. The computer program product of claim 10, wherein said source and target volume comprise physical volumes.

14. The computer program product of claim 10, further comprising:

computer readable program code which causes said programmable computer processor to receive a request to update the data in said source volume;

computer readable program code which causes said programmable computer processor to update the physical location pointer for said source volume to indicate the location of the copied tracks in said target volume;

computer readable program code which causes said programmable computer processor to set the physical location pointer reserved flag for said target volume;

computer readable program code which causes said programmable computer processor to set the physical location pointer for said target volume to indicate the track location in the source volume;

computer readable program code which causes said programmable computer processor to set the forward target pointer of said source volume to a null value;

computer readable program code which causes said programmable computer processor to maintain the forward target pointer of the target volume to a null value;

computer readable program code which causes said programmable computer processor to maintain the backward source pointer of the source volume to a null value;

computer readable program code which causes said programmable computer processor to set the backward source pointer of the target volume to a null value; and, computer readable program code which causes said programmable computer processor to write the data update to the target volume.

* * * * *